United States Patent
Uchida et al.

(10) Patent No.: US 7,123,293 B1
(45) Date of Patent: Oct. 17, 2006

(54) IMAGE PROCESSING METHOD TO COMPENSATE FOR COLOR DIFFERENCES DUE TO A TYPE OF IMAGE SENSING DEVICE

(75) Inventors: Mitsuhiro Uchida, Kanagawa-ken (JP); Noboru Sasaki, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/225,486

(22) Filed: Jan. 6, 1999

(30) Foreign Application Priority Data

Jan. 7, 1998 (JP) .................. 10-001457
Apr. 1, 1998 (JP) .................. 10-088357

(51) Int. Cl.
*H04N 5/228* (2006.01)

(52) U.S. Cl. ........................... 348/222.1
(58) Field of Classification Search ........... 348/175, 348/223.1, 222.1
See application file for complete search history.

(56) References Cited

U.S. PATENT DOCUMENTS

| | | | | |
|---|---|---|---|---|
| 4,279,502 A | | 7/1981 | Thurm et al. | |
| 5,010,393 A | * | 4/1991 | Saito | 348/225.1 |
| 5,497,431 A | * | 3/1996 | Nakamura | 382/162 |
| 5,568,194 A | * | 10/1996 | Abe | 348/223.1 |
| 5,663,772 A | * | 9/1997 | Uehara et al. | 348/671 |
| 5,682,573 A | * | 10/1997 | Ishikawa et al. | 399/46 |
| 5,689,590 A | * | 11/1997 | Shirasawa et al. | 705/52 |
| 5,696,840 A | * | 12/1997 | Usami | 382/167 |
| 5,754,316 A | * | 5/1998 | Hayashi et al. | 358/518 |
| 5,767,983 A | * | 6/1998 | Terashita | 358/302 |
| 5,917,578 A | * | 6/1999 | Nakamura | 355/40 |
| 6,097,845 A | * | 8/2000 | Ng et al. | 382/239 |
| 6,324,345 B1 | * | 11/2001 | Enomoto | 396/311 |
| 6,463,173 B1 | * | 10/2002 | Tretter | 382/168 |
| 2001/0009438 A1 | * | 7/2001 | Kihara et al. | 348/223 |

FOREIGN PATENT DOCUMENTS

JP  55-46741  4/1980

* cited by examiner

*Primary Examiner*—David Ometz
*Assistant Examiner*—James M. Hannett
(74) *Attorney, Agent, or Firm*—Sughrue Mion, PLLC (57) ABSTRACT

In image processing on digital image signals, a color difference due to a type of image sensing device by which the image signals have been acquired is compensated. For this purpose, a characteristic value, such as an average of each digital image signal, is extracted from digital image signals of a plurality of subjects photographed by the same image sensing device. Based on the characteristic value, conversion of each image signal is carried out.

11 Claims, 2 Drawing Sheets

FIG. 2

IMAGE PROCESSING METHOD TO COMPENSATE FOR COLOR DIFFERENCES DUE TO A TYPE OF IMAGE SENSING DEVICE

BACKGROUND OF THE INVENTION

1. Field of the Invention

The present invention relates to a method and apparatus for processing a digital image signal acquired by an image sensing device, such as a digital camera, which records a digital image signal.

2. Description of the Related Art

Recently, digitization is progressing in various fields, and system configurations are being changed substantially. Photograph-related industries are not an exception, and digital still cameras (hereinafter called digital cameras) which photoelectrically convert object images into image signals by using CCDs, and digitize and record the image signals by AD conversion thereon have been spreading.

Following the spread of such digital cameras, a service (hereinafter called a digital printing service) for generating color prints from digital image signals acquired by digital cameras is gradually spreading. However, the image quality of prints obtained by using such a service is inferior to that by a conventional color printing service (hereinafter called a conventional service) wherein prints are generated from negative color films. As factors of this, the following can be listed:

1) Image quality of a digital camera itself as an image sensing device

2) Differences in performance between different types of digital cameras

3) Differences in performance between digital cameras of the same type

4) Differences or fluctuation in performance of a digital camera

For the image quality of digital cameras listed in 1), it is rapidly improving due to enhanced performance of CCDs or the like. However, for the performance differences in 2) to 4), no measures have been taken.

Meanwhile, in a conventional service, the same problems as in the digital printing service exist. Changing the 4 factors in the digital printing service into those in a conventional service, the following is listed:

1') Image quality of a negative color film itself and that of a camera using silver halide films as an image sensing device 2') Differences in performance between varieties of negative color films 3') Differences in performance due to various factors (such as development processing, temperature, and humidity) related to negative color films of the same variety 4') Differences in performance due to various factors of a negative color film In a conventional service, color balance and print density are the only parameters controlling the image quality. Especially, the color balance is the most important parameter. Therefore, in order to improve print quality, various methods for stabilizing the color balance have been proposed.

For example, in order to cancel the difference in print quality due to the factor in 2'), a method wherein characteristic information regarding a negative color film is stored in a memory or the like for each type of negative film and a print generating condition is decided based on the information has been proposed (this is a so-called multi-channel method). However, in the case of a negative color film, the factors in 3') and 4'), such as a difference in development processing and a performance change due to temperature and humidity, are very influential. Especially, once performance of a negative color film has changed due to exposure to high temperature or the like, the performance does not recover. Therefore, the improvement of print quality by the multi-channel method has a limit. For this reason, in the case where an image in each frame is read from a film having a plurality of frames and print exposure is decided based on primary-color information of each pixel in each frame, a method of controlling the exposure has been proposed (see Japanese Unexamined Patent Publication No. 55(1980)-46741). In this method, density differences between a first and a second primary colors, between a third primary color and either the first or the second primary color, and the average density of the 3 primary colors are found to generate a characteristic curve representing relations of the density differences to the average density, and exposure is controlled by finding a characteristic value for the negative color film based on the characteristic curve. As has been described in the above, in the case of a negative color film, the above factors 3') and 4') are influential, and it is necessary to use information of a plurality of frames in order to estimate the characteristic of a negative film even when the films are of the same variety.

Meanwhile, in the case of a digital camera, since tens of new types are released every year, it is practically impossible to decide a print generating condition by using characteristic information of each type of digital cameras, as in the multi-channel method. Therefore, it is necessary to estimate, using some method, the performance differences stated in 2) between various types of digital cameras.

Meanwhile, CCDs used in digital cameras are very durable, and have little performance change when the temperature or humidity changes. For example, under a high temperature, noise due to a dark current increases, while signal strength shows little change. Unlike negative films, the level of the dark current resumes when the temperature is changed to the original temperature. Since CCDs have little performance change as has been described in the above, one image signal has been thought to be enough to estimate the characteristic of a digital camera, and little print quality improvement has been expected from usage of a plurality of image signals to estimate the characteristic of the digital camera.

However, in a digital printing service, even when the difference in 2) above can be suppressed completely, the differences in 3) and 4) are not negligible. In other words, even when the types of digital cameras are the same, or when the performance differences due to the types of digital cameras can be suppressed, color differences due to variances between digital cameras, such as subtle differences in sensitivity of CCDs or differences in lens performances can be created. Furthermore, in a digital camera having an automatic white-balancing function, image signals can have variances due to a difference based on each camera, and the print quality may be lowered as a result of this.

SUMMARY OF THE INVENTION

Based on considerations of the above problems, an object of the present invention is to provide an image processing method and an image processing apparatus which can obtain a reproduced image in high quality by carrying out image processing on a digital image signal acquired by an image sensing device such as a digital camera.

An image processing method of the present invention carries out image processing on a digital image signal and comprises the steps of:

extracting a characteristic value representing a characteristic of an image sensing device from digital image signals of a plurality of images of subjects photographed by the image sensing device; and carrying out image processing according to the characteristic value on the digital image signals.

The "digital image signals" herein referred to mean at least 2, or preferably more than 4 digital image signals.

The "characteristic of an image sensing device" means a characteristic of a digital image signal due to the type of image sensing device or a variance thereof. More specifically, the characteristic means color, brightness, tone, sharpness, and the like.

In the image processing method of the present invention, when each of the digital image signals is composed of RGB color signals, it is preferable that the characteristic value is a total average of averages of the digital image signals and the image processing is processing such that RGB color signals in a digital image signal representing an image of a gray subject are converted to be equalized, based on the total average.

The "total average" means an average of averages of the digital image signals, each of the averages being found for each of the digital image signals.

In this case, it is preferable for the total average to be an average of weight-averages based on weight coefficients each of which is determined by a color of each pixel in each of the digital image signals. In this case, it is also preferable for the image processing to be carried out by weighting the average or the weight-averages by using a predetermined weight coefficient.

The characteristic value may be extracted based on a histogram or a cumulative histogram of each of the digital image signals. Especially, when each of the digital image signals is composed of color signals, the histogram or the cumulative histogram may be found based on the digital image signal from which high saturation pixels have been eliminated. In this case, it is preferable for the image processing to convert, based on the characteristic value, contrast of the image represented by the digital image signal.

Furthermore, when each of the digital image signals is composed of RGB color signals, it is preferable that the characteristic value is a value regarding chroma or color saturation of each of the digital image signals and the image processing converts the chroma of the digital image signal, based on the characteristic value.

Moreover, when each of the digital image signals is composed of RGB color signals, it is preferable that the characteristic value is a value of each color signal of each pixel in each of the digital image signals against an average of the color signals thereof and the image processing converts the digital image signal by referring to a table representing a relation between the characteristic value and the average of the color signals.

When each of the digital image signals is composed of RGB color signals, it is preferable that the characteristic value is a value of each color signal or values of color signals other than one of the RGB color signals in each pixel in each of the digital image signals against the value of the one color signal, and the image processing converts the digital image signal by referring to a table representing a relationship between the value of the one color signal and the characteristic value.

In the case where the image processing is carried out by referring to the table, it is preferable for the characteristic value to be found based on the digital image signal from which high saturation pixels have been eliminated.

In the image processing of the present invention, it is preferable for the characteristic value to be extracted from a thumbnail image signal of each of the digital image signals. In the case where each of the digital image signals is of JPEG image file format, it is preferable for the characteristic value to be extracted based on a signal of a direct current component in the JPEG image file.

It is also preferable for the image sensing device to convert information of a photographed subject into a digital image signal and to comprise recording means for recording the digital image signal in a recording medium. In this case, a flag indicating whether or not the digital image signal has been corrected after photographing is preferably recorded in the recording medium together with the digital image signal so that the extraction of the characteristic value and the image processing are carried out only on a digital image signal having the flag among the digital image signals.

An image processing apparatus of the present invention carries out image processing on a digital image signal, and comprises:

characteristic value extracting means for extracting a characteristic value representing a characteristic of an image sensing device from digital image signals of a plurality of images of subjects photographed by the image sensing device; and image processing means for carrying out image processing according to the characteristic value on the digital image signals.

In the image processing apparatus of the present invention, when each of the digital image signals is composed of RGB color signals, it is preferable that the characteristic value extracting means extracts the characteristic value as a total average of averages of the digital image signals and the image processing means carries out image processing such that RGB color signals in a digital image signal representing an image of a gray subject are converted to be equalized, based on the total average.

Furthermore, it is preferable for the characteristic value extracting means to extract the total average as an average of weight-averages based on weight coefficients, each of which is determined by a color of each pixel in each of the digital image signals. In this case, it is also preferable for the image processing to be carried out by weighting the average or the weight-averages by using a predetermined weight coefficient.

In the image processing apparatus of the present invention, the characteristic value extracting means may extract the characteristic value from a histogram or a cumulative histogram of each of the digital image signals. Especially, when each of the digital image signals is composed of color signals, it is preferable for the histogram or the cumulative histogram to be found based on the digital image signal from which high saturation pixels have been eliminated. In this case, it is preferable for the image processing means to convert, based on the characteristic value, contrast of the image represented by the digital image signal.

Furthermore, when each of the digital image signals is composed of RGB color signals, it is preferable that the characteristic value extracting means extracts the characteristic value as a value regarding chroma or color saturation of each of the digital image signals, and the image processing means converts, based on the characteristic value, the chroma of the digital image signal.

Moreover, when each of the digital image signals is composed of RGB color signals, it is preferable that the characteristic value extracting means extracts the characteristic value as a value of each color signal of each pixel in each of the digital image signals against an average of the color signals thereof and the image processing means converts the digital image signal by referring to a table representing a relationship between the characteristic value and the average of the color signals.

When each of the digital image signals is composed of RGB color signals, it is preferable that the characteristic value extracting means extracts the characteristic value as a value of each color signal or values of color signals other than one of the RGB color signals in each pixel in each of the digital image signals against the value of the one color signal, and the image processing means converts the digital image signal by referring to a table representing a relationship between the value of the one color signal and the characteristic value.

In this case, it is preferable for the characteristic value extracting means to extract the characteristic value based on the digital image signal from which high saturation pixels have been eliminated.

In the image processing apparatus of the present invention, it is preferable for the characteristic value extracting means to extract the characteristic value from a thumbnail image signal of each of the digital image signals. In the case where each of the digital image signals is of JPEG image file format, it is preferable for the characteristic value extracting means to extract the characteristic value from a signal of a direct current component in the JPEG image file.

It is also preferable for the image sensing device to comprise recording means for converting information of a photographed subject into a digital image signal and recording the digital image signal in a recording medium. In this case, the recording means records the digital image data in addition to a flag indicating whether or not the digital image signal has been corrected after photographing in the recording medium so that the characteristic value extracting means and the image processing means carry out the extraction of the characteristic value and the image processing only on a digital image signal having the flag among the digital image signals.

According to the image processing method and apparatus of the present invention, since the characteristic value representing a characteristic of an image sensing device is extracted from digital image signals of images of subjects photographed by the image sensing device, the characteristic value best represents the characteristic of the image sensing device, regardless of what a subject to be photographed is. In other words, in the case where a digital image signal is acquired by photographing a subject of high chroma or a subject in backlight, an error in the characteristic value of each digital image signal due to a photographed subject is compensated, since the characteristic value has been obtained by using a plurality of digital image signals. As a result, the characteristic value best represents the characteristic which is inherent to the image sensing device. Furthermore, a difference due to not only the type of a camera but also each camera of the same type can be corrected. Therefore, by carrying out image processing corresponding to the characteristic value on a digital image signal, an optimal image processing is carried out on the digital image signal, based on the characteristic value. By reproducing the digital image signal whereon the image processing has been carried out, a reproduced image in high quality with the optimal image processing thereon can be obtained.

When the digital image signals are composed of RGB color signals, the characteristic value is found as the total average of averages of the digital image signals, and the RGB color signals in a digital image signal representing a gray subject are converted to have a uniform value, based on the total average. In this manner, image processing can be carried out on a gray image signal so that the signal can be reproduced as appropriate grays, and a reproduced image in high quality with its color having been corrected appropriately can be obtained.

In this case, by finding the total average as an average of weight-averages based on weight coefficients, each of which is determined by a color of each pixel in each digital image signal, a characteristic value which is not influenced by saturation can be obtained by application of a small weight to a high saturation pixel, for example.

Furthermore, by carrying out the image processing wherein the average or the weight-averages are obtained based on a predetermined weight coefficient, color temperature of a subject represented by a digital image signal can be corrected as well.

Moreover, when a digital image signal is composed of RGB color signals, the characteristic value can be the value of each color signal in each pixel against the average of color signals in each pixel in each digital signal so that a table representing a relationship between each color signal and the characteristic value is obtained. By referring to this table, the digital image signals are converted and the calculation time is reduced. In this manner, the image processing is carried out efficiently on the digital image signal. In this case, the calculation time can be reduced as well by letting the characteristic value be the value of each color signal or of color signals other than one of the RGB color signals in each pixel in each digital image signal so that a table representing a relationship between the value of the one color signal and the characteristic value is obtained for the image processing on the digital image signal.

When the table is generated, by finding the characteristic value from the digital image signal whose high saturation pixels have been removed, the characteristic value which is appropriate and not influenced by the saturation can be obtained.

When a thumbnail image signal for each digital image signal has been generated, the calculation time for finding the characteristic value can be reduced substantially by extracting the characteristic value based on the thumbnail image signal, since the amount of data of each digital image signal is reduced in a thumbnail image signal.

When the digital image signal is of a JPEG image file format, the calculation time for finding the characteristic value can be reduced by extracting the characteristic value from a direct current component in the JPEG image file.

By recording the flag indicating whether or not image processing has been carried out on a digital image signal by an image sensing device is recorded in a recording medium when the digital image signal is recorded in the recording medium by the image sensing device, the extraction of the characteristic value and image processing can be carried out only on a digital image signal having the flag. In this manner, no redundant image processing is carried out on the digital image signal having been processed, and efficient image processing is realized.

DESCRIPTION OF THE PREFERRED EMBODIMENT

Figure 1:
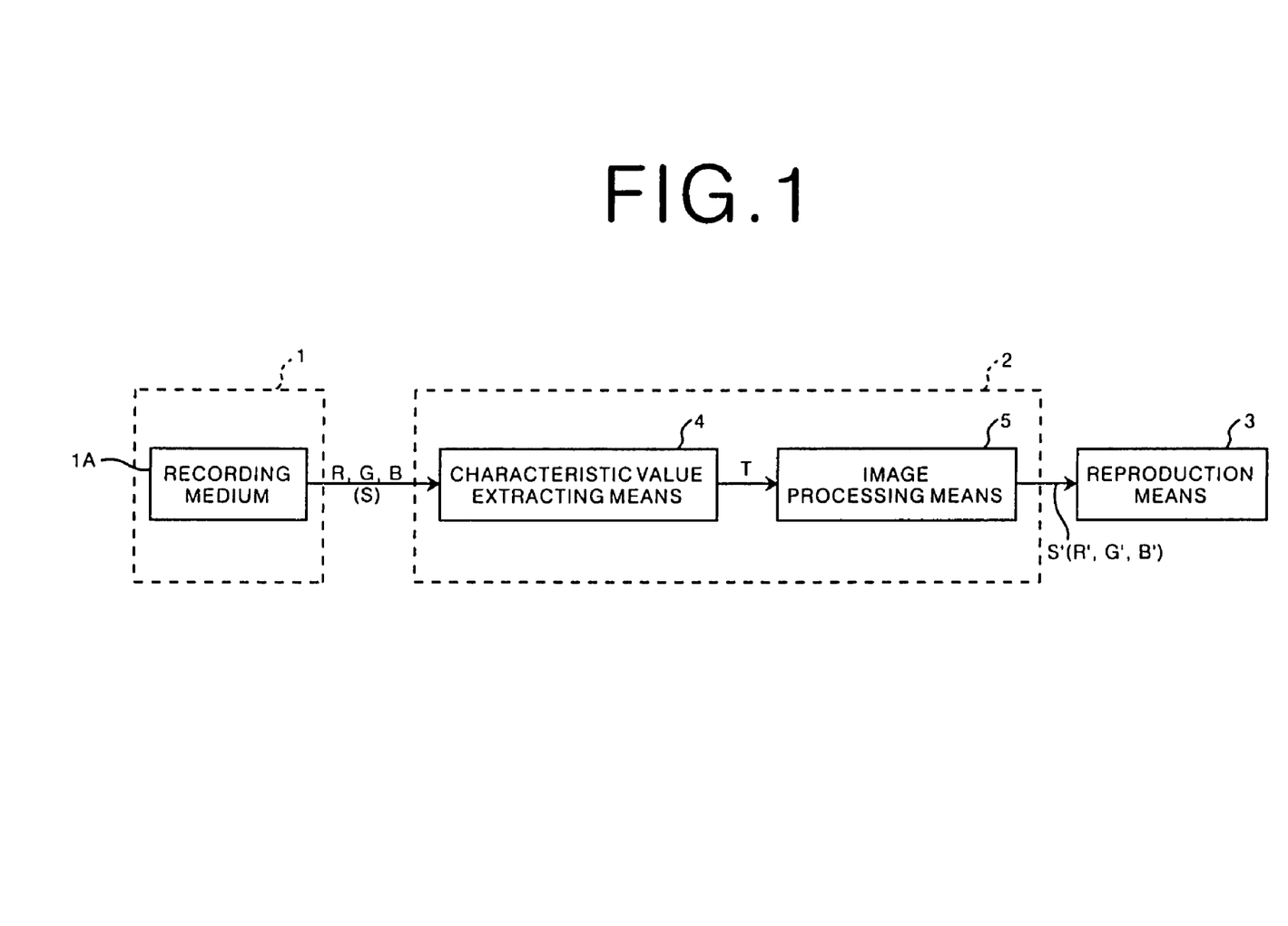
FIG. 1 is a block diagram showing a configuration of an image reproducing system including an image processing apparatus as an embodiment of the present invention.

Hereinafter, an embodiment of the present invention will be explained with reference to the accompanying drawing. FIG. 1 is a block diagram showing a configuration of an image reproducing system including an image processing apparatus as the embodiment of the present invention. As shown in FIG. 1, the image reproducing system including the image processing apparatus of the present invention in this embodiment comprises an image sensing device 1 such as a digital camera which records a digital image signal S acquired by photographing a subject in a recording medium 1A such as a memory card, an image processing apparatus 2 for acquiring a processed image signal S' by carrying out image processing on the digital image signal S recorded in the recording medium 1A, and a reproduction device 3 for reproducing the processed image signal S' as a visible image on a print or on a CRT display or the like. The digital image signal S is a color image signal and is composed of three color signals, namely R, and B.

Figure 2:
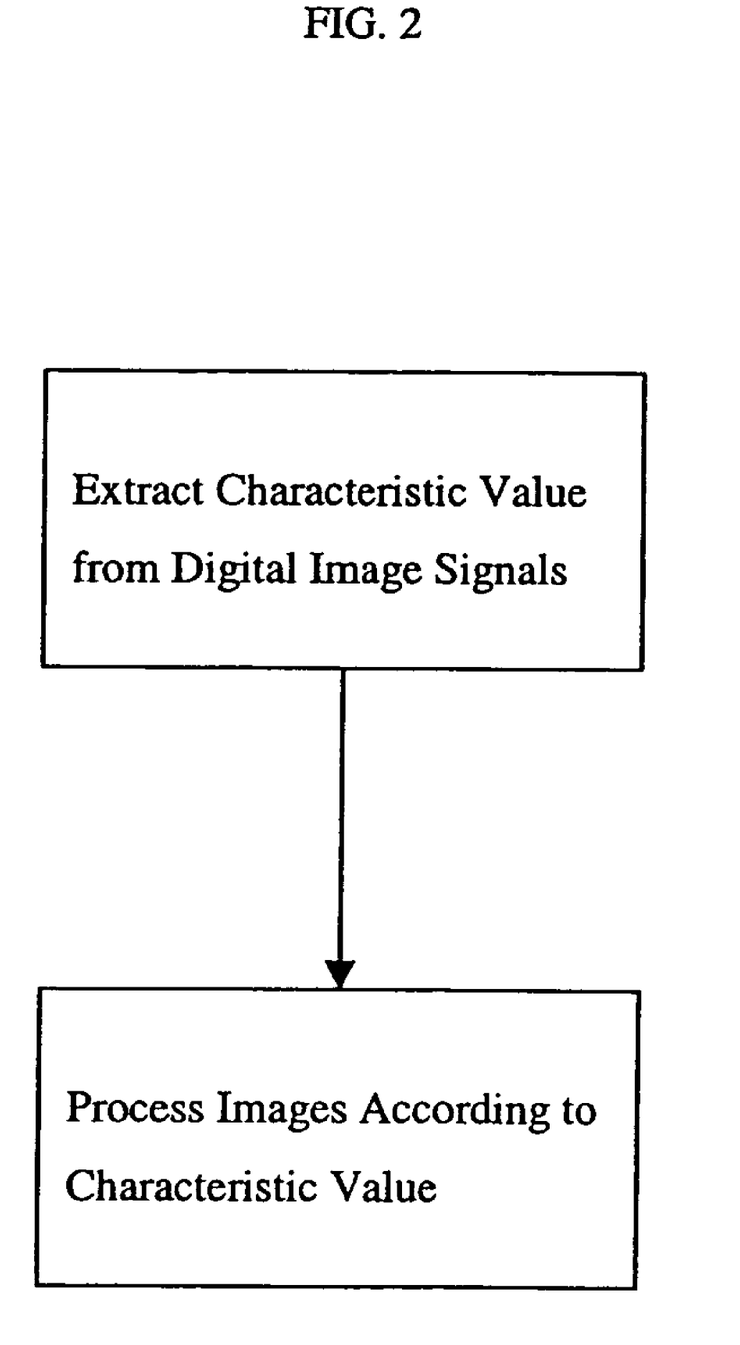
FIG. 2 is a block diagram showing an exemplary embodiment of a method of the present invention.

0le;.5qAs shown in FIG. 2, an exemplary embodiment of a method of the present invention includes extracting a characteristic value from digital image signals and processing images according to the characteristic value.

The image processing apparatus 2 comprises characteristic value extracting means 4 which extracts a characteristic value T representing a characteristic of the image sensing device 1 based on a plurality of the digital image signals S, and image processing means 5 for carrying out image processing on the digital image signals S based on the characteristic value T. In this embodiment, color correction to change the gray balance of the digital image signals S to an appropriate one based on the characteristic value T is carried out as the image processing. The digital image signals S are input from the recording medium 1A to the image processing apparatus 2. Since the recording medium 1A usually has only the digital image signals S acquired by the image sensing device 1 alone, it is easy for the image processing apparatus 2 to recognize the digital image signals S recorded by the image sensing device 1.

In this embodiment, since the image processing to correct the gray balance of the digital image signals S is carried out, an average of color signals R, G, and B composing each digital image signal S is found as the characteristic value T by the characteristic value extracting means 4. As a method of finding the average, averages Ri, Gi, and Bi of the color signals R, G, and B are respectively found first for each digital image signal S. Averages Rave, Gave, and Bave of the averages Ri, Gi, and Bi are then found. When the number of the digital image signals S is N, the averages Rave, Gave, and Bave are found by the following equation (1):

Rave=$\Sigma Ri/N$

Gave=$\Sigma Gi/N$

Bave=$\Sigma Bi/N$ (1)

where i=1–N.

In order to improve accuracy of the characteristic value T, it is preferable for the characteristic value to be an average of pixels selectively extracted, rather than to be a simple average. For example, color difference signals such as $\Delta GR=G-R$, $\Delta GB=G-B$ are generated for each digital image signal S and pixels wherein absolute values of the color difference signals $\Delta GR$ and $\Delta GB$ are smaller than a predetermined threshold value are extracted. In this manner, only pixels in low saturation are extracted to be reflected in the characteristic value T. Furthermore, instead of using the color difference, the color signals R, G, and B are converted into luminance, hue, and saturation signals by matrix processing thereon and threshold processing may be carried out on the saturation signal. In this manner, only pixels with saturation lower then a predetermined threshold value are extracted to be reflected in the characteristic value T. Moreover, in response to saturation or the color difference, a weighted average can be obtained by using weight coefficients changing weight for the average. By finding an average based on the pixels selectively extracted in the above manner, an influence of a subject having high saturation on the digital image signal S is suppressed, and the characteristic value T can be obtained more accurately.

In the image processing means 5, the image processing below is carried out.

(Method 1)

Based on the averages Rave, Gave, and Bave found through the above procedure, processing shown by Equations (2) below is carried out on each pixel in the digital image signal S:

$R'=R+(\text{Gave}-\text{Rave})$ $G'=G$ $B'=B+(\text{Gave}-\text{Bave})$ (2)

where, R' G', and B' are signals of each pixel in each digital image signal after processing, while R, G, and B are the ones before processing.

By the image processing based on Equations (2), a variance in reproduced colors due to the characteristic of the image sensing device 1 can be corrected.

Using, as parameters, the averages Rave, Gave, and Bave found through the above procedure, processing expressed by Equations (3) below may be carried out on each pixel in the digital image signal S (Method 2). In Equations (3), averages Ri, Gi, and Bi of each digital image signal S are used in the calculation.

$R'=R+k1(\text{Gave}-\text{Rave})+k2(Gi-Ri)$ $G'=G$ $B'=B+k1(\text{Gave}-\text{Bave})+k2(Gi-Bi)$ (3)

where k1 and k2 are weight coefficients which satisfy k1+k2=1.

By the image processing based on Equations (3), in addition to the variance in color reproduction, a difference in color temperature of a photographed subject can be corrected. In Equations (2) and (3), G is used as a reference, which can be R or B.

Furthermore, a histogram or a cumulative histogram of the digital image signals S may be extracted as the characteristic value T to be used in image processing (Method 3). In Method 3, the characteristic value T is found through the procedure below. First, a histogram of N digital image signals S is obtained. Although it is preferable to find a histogram of selected pixels while high saturation pixels are eliminated, normalization in response to selected pixels is carried out in this case so that each pixel contributes equally. Characteristic values T of various secondary characteristics can be re-extracted from the histogram. For example, a median of the digital image signal S, an average of ±10% shade distribution centering the median, and a slope of a cumulative histogram near the median can be found easily. After the extraction of the characteristic value T from the histogram or the cumulative histogram, image processing according to Methods 1 or 2 above can be carried out on each image signal.

In this embodiment, it is necessary to input all digital image signals S recorded in the recording medium 1A to the image processing apparatus 2 in order to extract the characteristic value T. However, since the digital image signals S are usually recorded in files corresponding to images on a one to one basis, it is time consuming to read the digital image signals S and to extract the characteristic value T, which is not preferable. Meanwhile, some image file formats can include, in an image file, a thumbnail image which is an image of the original in a reduced size with fewer pixels. When such an image file format is available, the characteristic value T is extracted from a thumbnail image signal representing the thumbnail image. In this manner, the characteristic value T can be extracted in a short time even when the number of files is large, and the procedure quickly proceeds to the following image processing on the original image.

Examples of the present invention will be explained next.

Example 1

50 images were photographed by using a digital still camera DS-300 of Fuji Photo Film Co. Ltd. In each subject having been photographed, a gray print having a neutral gray color with 18% reflectivity was included. After the image files were read by a personal computer having IBM/PCAT compatibility, the following image processing was carried out thereon. The image files were then output to a Pictrography 3000 of Fuji Photo Film Co. Ltd. to generate hard copies of the images. The characteristic value T was extracted from thumbnail images included in the JPEG files. In the image processing, data of G remained as they were, and shifts of R and B calculated by each method below were found for all pixels.

A) No image processing

B) The shifts are found for each image so that averages of RGB values calculated by using each image agree.

C) The shifts are found for each image so that the RGB values of the neutral gray in each image agree.

D) The shifts are found by using Method 2 with k1=0.5 and k2=0.5.

E) The shifts are found by using Method 3. The characteristic value is an average of data of ±10% shade distribution centering a median of a cumulative histogram, with both k1 and k2 being 0.5.

The density of the neutral gray in the 50 images generated through the above processing was measured and SN ratios were calculated by using Equation (4) below:

$$SN\ \text{ratio} = 10 \times \log(100/\Sigma((R-G)^2 + (B-G)^2)) \quad (4)$$

Judgmental evaluation of the images was carried out by 10 examiners. Totals of evaluation by the 10 examiners regarding the finish of the 50 images were found, with 10 being a full score for an examiner.

TABLE 1

|  | A | B | C | D | E |
| --- | --- | --- | --- | --- | --- |
| SN ratio | 12.5 | 20.5 | 57.4 | 36.7 | 45.5 |
| Evaluation | 37 | 45 | 95 | 87 | 90 |

As has been shown in the above, D and E of the present invention exceed a conventional method A or B in the SN ratio and the judgmental evaluation. The present invention can thus provide prints or image signals in higher quality.

Example 2

50 images were photographed by the same method as in Example 1. However, photographing was carried out by each of the following 4 kinds of cameras whose gains were adjusted so that RGB values of 18% shade gray in an 18%-shade Gary print photographed under daylight were as follows:

a) R=128, G=128, B=128 b) R=108, G=128, B=128 c) R=128, G=108, B=128 d) R=128, G=128, B=108.

Image processing according to Methods A and C in Example 1 was carried out to obtain SN ratios.

TABLE 2

|  | A | C |
| --- | --- | --- |
| a) | 12.5 | 57.4 |
| b) | 6.7 | 56.7 |
| C) | 6.4 | 57.3 |
| d) | 6.8 | 56.5 |

As shown in Table 2, the image processing method of the present invention can provide a print or image data having stable finish quality, regardless of variances in cameras' performance.

Example 3

By using 5 kinds of digital cameras of different manufacturers, each camera photographed 50 images each. Hard copies of the images were generated by using a pictorography 3000 of Fuji Photo Film Co. Ltd. to judge passing ratios. The passing ratios were judged by whether or not the gray balance in each image is acceptable for shipment. Upon comparing the hard copies, the following two methods were adopted:

(1) The images are output as they are, without being processed.

(2) After color correction using image data for each camera obtained by the following method has been carried out, the images are output:

i) For each frame, a histogram is generated and RGB values are normalized at 1% highlight and 1% shadow so that high saturation pixels are removed.

ii) For the remaining range, accumulation of R and B data against G data is carried out on the original data without normalization. This accumulation is carried out for all pixels in all frames (except for high saturation pixels).

iii) An average is found by dividing the accumulation by the frequency of the accumulation (i.e., the number indicating how many times the values are accumulated). For these averages of R and of B against the data of G, response lines of R and of B against G are found by the least square method for each of the cameras.

iv) A print is generated for each frame in such a manner that the average between the R (and B) values corresponding to G=128 found through the steps i) to iii) by using the data of the frame alone and the R (and B) values for G=128 found through the steps i) to iii) by using the data of all frames becomes gray. In other words, for R and B values, image data to be output are obtained by adding or subtracting the difference between their respective averages and 128 for all pixels in the image.

Table 3 shows the result of the passing ratio judgment for prints generated through the methods in the above. The higher the passing ratio is, the more a service provider which provides to customers prints of images photographed by digital cameras can carry out an unmanned operation. Therefore, productivity is improved, which leads to increased profit. The ideal passing ratio is 100%.

TABLE 3

|  | (1) (%) | (2) (%) |
| --- | --- | --- |
| Camera 1 | 54 | 96 |
| Camera 2 | 36 | 94 |
| Camera 3 | 72 | 96 |
| Camera 4 | 44 | 92 |
| Camera 5 | 38 | 96 |

As has been described in the above, according to the present invention, passing ratios of more than 90% can be achieved by images acquired by digital cameras with which the passing ratios would be low if the images were output without the processing.

Example 4

As in Example 3, image processing by Methods (4) and (5) below was carried out on every 50 images acquired by each of the 5 kinds of digital cameras above. Prints were generated from the images and judgmental evaluation was carried out thereon, with 5 being a full score.

(Method 4)

i) Color correction is carried out according to Method 2 above.

ii) Pixels near highlight and shadow are eliminated and pixels mostly of the main photographed subject are extracted. For the extracted pixels, a histogram is generated and the histogram in the distribution range of 10–90% is defined as the contrast of the subject.

iii) The contrast of the subject is found for all frames and the average thereof is defined as the subject contrast of the camera. Tone correction is carried out on all frames so that the subject contrast of the camera becomes a target value. The tone correction can be carried out for R, G, and B respectively. However, in this method, the same tone correction is carried out on all RGB by using the average of RGB.

(Method 5)

i) Following Method 4 above, RGB values are converted into HSI according to Equations (4) below, for high saturation pixels.

$$I = 0.57735 \times (R+G+B)$$

$$V1 = 0.7071 \times (G-B)$$

$$V2 = 0.40824 \times (2R-G-B)$$

$$H = \tan^{-1}(V1, V2)$$

$$S(V1^2 + V2^2) \tag{4}$$

For high saturation pixels in all frames obtained by the same camera, an average Sh of saturation S is found.

ii) Color processing is carried out on images in all frames so that the saturation Sh becomes a target value. According to Equations (4) above, RGB values for each pixel are converted into HSI, and saturation Si of each pixel is converted by Equation (5) below to generate new saturation Si'. By inversion, Si' is converted into RGB again.

$$Si' = Si \times Sm/Sh \tag{5}$$

For 4 kinds of prints generated by Methods (1), (2), (4) and (5), judgmental evaluation was carried out, with 5 being a full score. Table 4 below shows the average of each camera.

TABLE 4

|  | Method 1 | Method 2 | Method 4 | Method 5 |
| --- | --- | --- | --- | --- |
| Camera 1 | 2.3 | 3.2 | 4.5 | 4.5 |
| Camera 2 | 1.8 | 3.0 | 3.8 | 4.3 |
| Camera 3 | 2.8 | 3.0 | 4.7 | 4.6 |
| Camera 4 | 2.2 | 3.1 | 3.9 | 4.4 |
| Camera 5 | 1.9 | 2.9 | 4.1 | 4.3 |

As shown by Table 4, satisfaction of users increases by carrying out gray balance correction according to Method 2, but this is not sufficient. By carrying out tone correction according to Method 4 and saturation (chroma) correction according to Method 5 in addition to Method 2, satisfaction improves substantially.

In the above embodiment, image processing is carried out on the digital image signals S according to the above Methods 1–5. The image processing may be carried out according to Method 6 below.

(Method 6)

For one digital image signal S, an average $Mj = (Rj + Gj + Bj)/3$ ($j = 1-m$, m is the number of pixels) is found for each pixel. A graph with the average Mj on the horizontal axis and the values of the color signals Rj, Gj, and Bj against the average Mj on the vertical axis is generated. This procedure is repeated for all digital image signals S and relationships between the average Mj and the color signals Rj, Gj, and Bj are obtained. When the Mj is the same, the color signals Rj, Gj, and Bj are accumulated and then the accumulated value is divided by the cumulative frequency to illustrate the relationships between the average Mj and the color signals Rj, Gj, and Bj. More specifically, areas for a counter equivalent to a quantized tone number and for data accumulation are set. The average Mj of the color signals is found for each pixel in the digital image signals S, and each color signal value against the average Mj is added to the data accumulation area while incrementing the counter. After this processing has been carried out on all pixels in all digital image signals S, the data in the data accumulation area is divided by the number in the counter. In this manner, a table for color signals Rj, Gj, and Bj against the average Mj in each pixel is obtained. Based on this table, curves or lines representing relationships between the output of the color signals Rj, Gj, and Bj to the average Mj are found by using a least square method or the like. By using these lines or curves, image processing for obtaining new RGB signal values by inverting the color signals in each pixel is carried out.

In this case, it is preferable for the table representing the RGB output against the average in each pixel to be generated from low saturation pixels alone, with high saturation pixels having been eliminated.

In Method 4, relationships between the average Mj and the color signals Rj, Gj, and Bj are found. However, relationships between one selected color signal (Rj, for example) and the remaining color signals (Gj and Bj) may be used as well. Alternatively, relationships between one color signal (for example Rj) and the 3 color signals (Rj, Gj, and Bj) may be adopted.

An image file format of the image sensing device 1 such as a digital camera is mainly JPEG (more precisely, JPEG File Interchange Format). In this file format, information compression according to DCT (Discrete Cosine Transfer) is carried out in a frequency domain. Therefore, decompressing processing needs some length of operation time. When the characteristic value T is extracted from such a file, direct current component data are preferably used for fewer operations. A direct current component herein referred to means a coefficient corresponding to 0 frequency upon the DCT transform. In the case of 8×8 block DCT for a JPEG file, the component is an average of 64 pixels. In this manner, by using the direct current component data of a JPEG file, time for extraction is much shorter than by extracting the characteristic value T after decompressing the image file.

Furthermore, in the case where the image sensing device records in the recording medium 1A the acquired digital image signals S after carrying out image processing thereon, a flag indicating whether or not the image processing has been carried out may be recorded in the recording medium 1A, together with the digital image signals S. In this manner, no image processing and no extraction of the characteristic value T need to be carried out on the digital image signals S having been processed by the digital camera, which leads to more efficient image processing on the digital image signals S.

In the above embodiment, the characteristic value T is the average of the digital image signals S and the image processing such that the gray balance of the digital image signals S is corrected is carried out on the signals. However, the characteristic value T and the image processing are not limited to the above examples. For example, when the histogram or the cumulated histogram of the digital image signal is obtained as a characteristic value T, a tone of each digital image signal S can be found as a characteristic value so that the tone becomes softer or harder according to the characteristic value. Alternatively, image processing to change the contrast can be carried out on the digital image signal S. When a frequency characteristic of the digital image signal S is used as the characteristic value T, smoothness processing may be carried out on the digital image signal S in the case where sharpness is high, or sharpness enhancing processing may be carried out otherwise.

Furthermore, the above image processing has been carried out on the 3-color digital image signals S in the above embodiment. However, the digital image signals are not limited to the above example, and the characteristic value can be extracted for digital image signals S with luminance signal alone or digital image signals S having 4 or more colors, to be used in the image processing thereon.

What is claimed is:

1. An image processing method of carrying out image processing on a digital image signal, the image processing method comprising:

extracting a characteristic value representing a characteristic of an image sensing device from digital image signals of a plurality of images of subjects photographed by the image sensing device; and carrying out image processing according to the characteristic value on the digital image signals;

wherein the characteristic value, when each of the digital image signals is composed of RGB color signals, is a total average of averages of the digital image signals and the image processing converts RGB color signals in a digital image signal representing an image of a gray subject to be equalized, based on the total average;

wherein the image processing is carried out by weighting the averages by using predetermined weight coefficients;

wherein each of the digital image signals is stored as an image file; and wherein $R'=R+k1(Gave-Rave)+k2(Gi-Bi)$, $G'=G$, $B'=B+k1(Gave-Bave)+k2(Gi-Bi)$, where R, G and B are the ROB color signals, Ri, Gi and Bi are averages of the digital image signals, Rave, Gave and Bave are total averages of the averages of the digital image signals, k1 and k2 are the predetermined weight coefficients, and R', G' and B' are converted R, G and B signals.

2. An image processing method as claimed in claim 1, wherein the total average is an average of weight-averages based on weight coefficients, each of which is determined by a color of each pixel in each digital image signal.

3. An image processing method as claimed in claim 1, wherein the extracting process and the image processing are separately performed.

4. The method of claim 1, wherein the image processing is carried out on each of the plurality of images used in obtaining the characteristic value.

5. An image processing apparatus for carrying out image processing on a digital image signal, the image processing apparatus comprising:

characteristic value extracting means for extracting a characteristic value representing a characteristic of an image sensing device from digital image signals of a plurality of images of subjects photographed by the image sensing device; and image processing means for carrying out image processing according to the characteristic value on the digital image signals;

wherein each of the digital image signals is stored as an image file; and wherein $R'=R+k1(Gave-Rave)+k2(Gi-Bi)$, $G'=G$, $B'=B+k1(Gave-Bave)+k2(Gi-Bi)$, where R, G and B are the digital image signals, Ri, Gi and Bi are averages of the digital image signals, Rave, Gave and Bave are total averages of the averages of the digital image signals, k1 and k2 are predetermined weight coefficients, and R', G' and B' are the R, G and B signals that have been image processed.

6. The apparatus of claim 5, wherein the image processing is carried out on each of the plurality of images used in obtaining the characteristic value.

7. An image processing method of carrying out image processing on a digital image signal comprising:

extracting a characteristic value representing a characteristic of an image sensing device from digital image signals of a plurality of images of subjects photographed by the image sensing device; and carrying out image processing on the digital image signals, according to the characteristic value, wherein the characteristic value relates to at least one of brightness, tone and sharpness of the image sensing device and is determined using digital image data derived from more than two different images photographed by the image sensing device;

wherein each of the digital image signals is stored as an image file; and wherein R'=R+k1(Gave−Rave)+k2(Gi−Bi),

G'=G,

B'=B+k1(Gave−Bave)+k2(Gi−Bi), where R, G and B are the digital image signals,

Ri, Gi and Bi are averages of the digital image signals,

Rave, Gave and Bave are total averages of the averages of the digital image signals, k1 and k2 are predetermined weight coefficients, and R', G' and B' are converted R, G and B signals.

8. The method of claim 7 wherein the characteristic value relates to tone.

9. The method of claim 7 wherein the characteristic value relates to sharpness.

10. The method of claim 7 wherein the characteristic value relates to one of tone and sharpness.

11. The method of claim 7, wherein the image processing is carried out on each of the plurality of images used in obtaining the characteristic value.

\* \* \* \* \*